United States Patent [19]
Granhom

[11] Patent Number: 5,127,285
[45] Date of Patent: Jul. 7, 1992

[54] THREADED SPINDLE-NUT DRIVE ASSEMBLY WITH VIBRATION REDUCING SUPPORT NUT ARRANGEMENT

[76] Inventor: Bo Granhom, Kungsgatan 61, S-736 00 Kungsör, Sweden

[21] Appl. No.: 561,333

[22] Filed: Aug. 1, 1990

[30] Foreign Application Priority Data

Aug. 4, 1989 [SE] Sweden .................................. 8902668

[51] Int. Cl.⁵ ........................... F16H 1/18; G05G 5/06
[52] U.S. Cl. ....................... 74/527; 74/424.8 R; 74/453
[58] Field of Search ............... 74/459, 424.8 R, 89.15, 74/424.8 NA, 424.8 A, 527, 531

[56] References Cited

U.S. PATENT DOCUMENTS

| | | | |
|---|---|---|---|
| 2,875,630 | 3/1959 | Gill et al. | 74/424.8 R |
| 2,875,631 | 3/1959 | Syring | 74/424.8 R |
| 3,132,719 | 5/1964 | Cole | 74/459 X |
| 3,304,794 | 2/1967 | Bird | 74/459 X |
| 3,669,460 | 6/1972 | Wysong | 74/459 X |
| 4,022,076 | 5/1977 | Metz | 74/459 X |
| 4,186,620 | 2/1980 | Brusasco | 74/424.8 R |
| 4,920,817 | 5/1990 | Granbom | 74/424.8 NA |
| 4,938,090 | 7/1990 | Brusasco | 74/424.8 R |
| 4,939,946 | 7/1990 | Teramachi | 74/459 X |
| 4,962,674 | 10/1990 | Payne | 74/527 X |

FOREIGN PATENT DOCUMENTS

| | | | |
|---|---|---|---|
| 500947 | 6/1930 | Fed. Rep. of Germany | 74/459 |
| 1504441 | 8/1989 | U.S.S.R. | 74/459 |

*Primary Examiner*—Vinh T. Luong
*Attorney, Agent, or Firm*—Cushman, Darby & Cushman

[57] ABSTRACT

A support nut is provided, preferably in a pair of two, on a helically threaded spindle having a drive nut threadedly mounted thereon for axial movement therealong. Each support nut constitutes a supporting device which moves axially along the threaded spindle-nut drive assembly for the purpose of preventing the occurrence of natural vibrations in the spindle. Each support nut (7) includes a ball race (7) which is arranged coaxially with the spindle. The ball race is provided with mutually parallel grooves, which extend transversely to the longitudinal axis of the ball race and the spindle, and with balls, which run in the parallel grooves and in the screw threads of the spindle. A ball retainer is arranged coaxially between the ball race and the spindle and is freely rotatable in relation to the ball race. A nut section is arranged coaxially around the ball race. A locking element is arranged between the nut section and the ball race, such as to enable the ball race to rotate relative to the nut section subsequent to exceeding a predetermined torque between the ball race and the nut section.

6 Claims, 3 Drawing Sheets

THREADED SPINDLE-NUT DRIVE ASSEMBLY WITH VIBRATION REDUCING SUPPORT NUT ARRANGEMENT

BACKGROUND OF THE INVENTION

The present invention relates to a support nut provided on the threaded spindle shaft of a threaded spindle-nut drive assembly for reducing vibration in the spindle as the spindle is rotated to axially advance and retract the drive nut also provided on the spindle.

When shafts, axes and, in the present case, screw spindles rotate, natural vibrations are induced in the rotating elongated element when the rotation elongated element reaches a characteristic critical speed of rotation, this critical speed being contingent on the diameter of the rotating elongated element in relation to its length and on the speed at which the rotating elongated element rotates. The smaller the diameter/length ratio, the lower the speed at which the rotating elongated element can be permitted to rotate if the rotating elongated element is to be prevented from reaching its critical speed.

Consequently, the rotational speed of longer spindles must be kept low, and the speed at which the nut moves will therefore be correspondingly slow. In order to enable the rotational speed of screw-spindles to be increased without inducing natural vibrations in them, it is usual at the present time to use support sleeves or collars, the smooth bores of which embrace the spindle and thereby support the spindle against a supporting device of the arrangement, the supporting device normally being a cylinder which coaxially, radially spacedly surrounds the spindle. These conventional support sleeves are moved with the aid of pull-rods, in a manner such that when the nut is located at one terminal position of the machine element, that is longitudinally moved by attachment to a drive nut that is threadedly mounted on the spindle for advancement and retraction as the spindle is rotated and counterrotated one support sleeve is located between the nut and a mutually adjacent end of the cylinder and the other support sleeve is located approximately axially centrally in the cylinder. The two support sleeves are connected together by means of the pull-rods. Thus, when the nut moves in the cylinder as the spindle rotates, the nut will ultimately engage the centre support sleeve so that, upon further rotation of the spindle in the same angular sense, the sleeve and nut will move together during continued movement of the nut. Consequently, this support sleeve, with the pull-rods, will draw with it the end-located support sleeve which will therewith move longitudinally along the cylinder at the spped of the nut, towards the centre of the cylinder, where the support sleeve remains stationed when the nut and the support sleeve coacting therewith reach the opposite terminal position in the cylinder.

Although this known type of support means is relatively simple, it creates a large amount of noise when the arrangement is in operation and causes wear on the screw thread crests of the screw-spindle.

SUMMARY OF THE INVENTION

The object of the present invention is to eliminate these drawings associated with known techniques, such as to prevent the occurrence of natural vibrations or oscillations in the threaded spindle shaft of a threaded spindle-drive nut assembly, as the spindle is rotated to axially advance and retract a drive nut threadedly mounted on the spindle.

BRIEF DESCRIPTION OF THE DRAWINGS

The invention will now be described in more detail with reference to exemplifying embodiments thereof illustrated in the accompanying drawings, in which.

DETAILED DESCRIPTION

Figure 1:
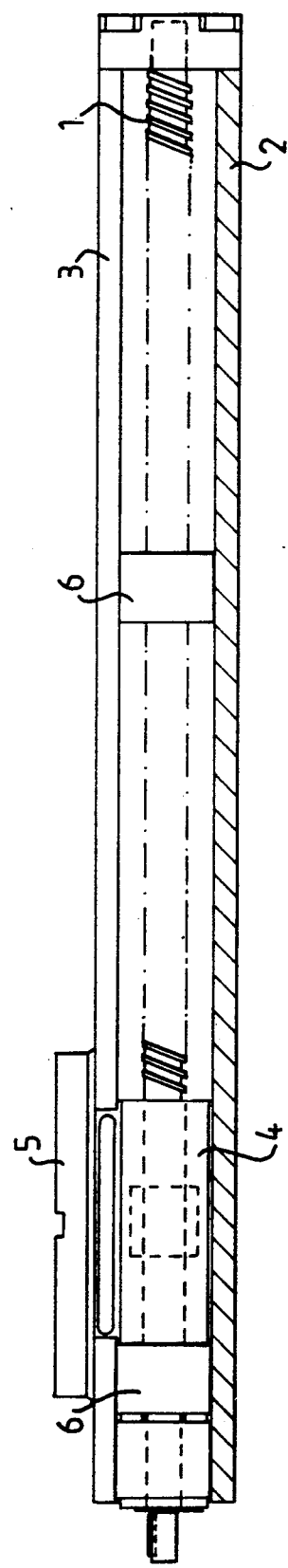
FIG. 1 illustrates schematically a threaded spindle-drive nut assembly provided with a set of two support nuts in accordance with the invention.

In the figures of the drawing, the reference numeral 1 identifies a schematically illustrated screw-spindle which has a pitch appropriate for the purpose reversibly longitudinally advancing and retracting along its own longitudinal axis, a drive nut 4 which is threadedly mounted on the spindle. As the spindle rotates, the drive nut travels axially, without rotating. By preference, the screw threadling provided on the spindle has a part-circular thread-profile (not shown). The spindle 1 is disposed coaxially in a cylinder 2, and the ends of the spindle are journalled in the end walls of the cylinder. The spindle extends through the left-hand end wall of the FIG. 1 embodiment, and is connected, outside of the cylinder in some appropriate manner, to drive means operative to rotate the spindle 1. A slot 3 extends along the length of the cylinder 2. The nut 4 driven by the spindle 1 is provided with a dogging or drive element 5 which extends through the slot 3. The drive element is useful to transmit the axial movement of the nut 4 for moving a structure (not shown) which may be mounted to the drive element 3 outside the cylinder 2, and/or for causing the drive element 3 to engage and/or disengage from another structure (not shown) located outside the cylinder (all of which is conventional). In accordance with the princples of the present invention, two support nuts 6 are mounted on the spindle 1, within the cylinder 2, respectively, on axially opposite both sides of the nut 4, as hereinafter described in more detail.

Figure 2:
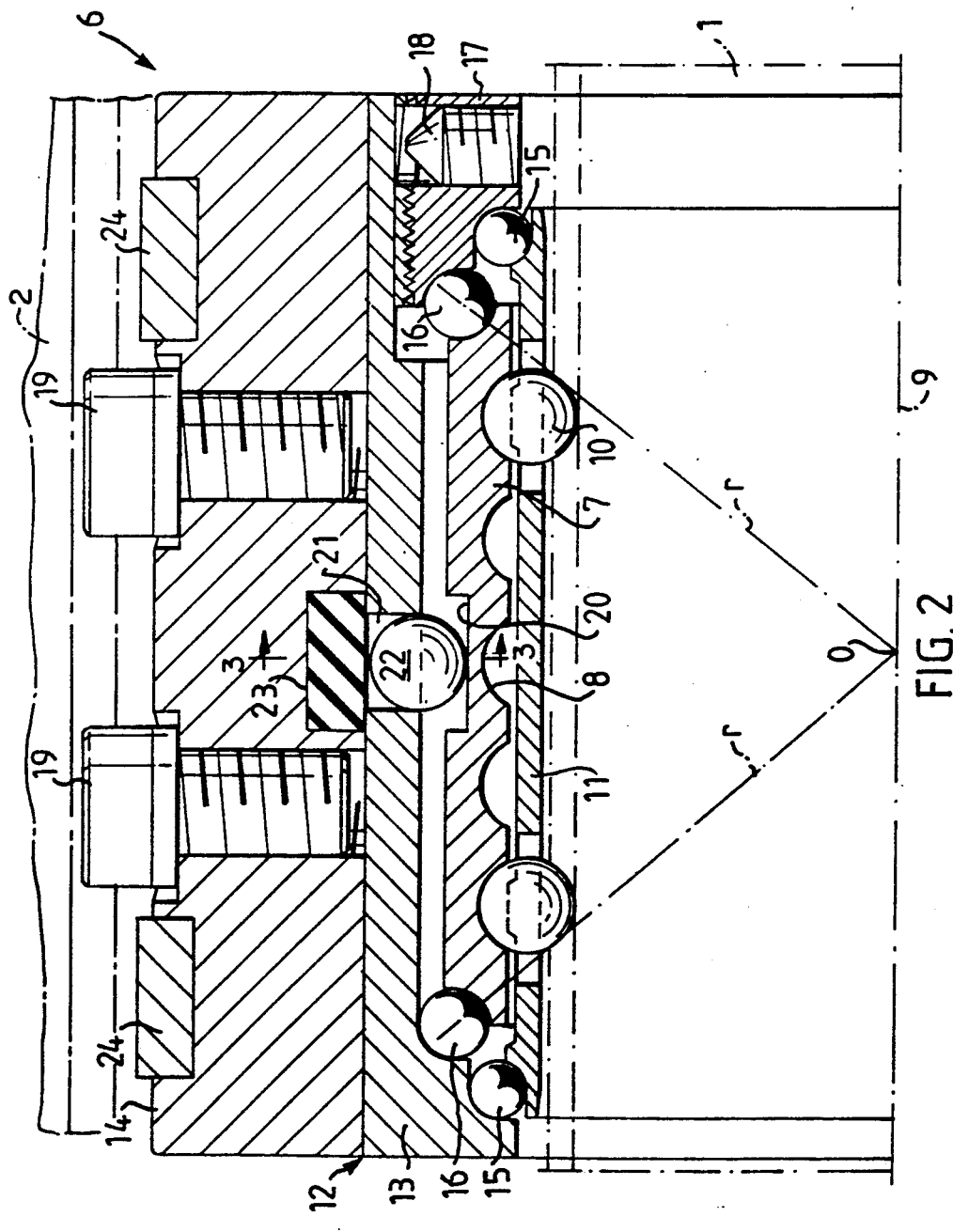
FIG. 2 is a longitudinal sectional view of one half of one of the support nuts of assembly shown in FIG. 1.

As will be seen more clearly from FIG. 2, each support nut 6 has a ball race 7 which is arranged coaxially around the spindle 1 and is provided with tracks or grooves 8 which extend parallel with one another and at right angles to the longitudinal axis 9 of the ball race and the spindle. The tracks 8 preferably have a part-circular profile, corresponding to the thread profile of the spindle 1, although this particularly preferred shape of profile is not as essential one. In the case of the illustrated embodiment, the ball race has five tracks 8. Balls 10 (of which only two are shown in FIG. 2) are active between the spindle 1 and the ball race 7. A ball retainer or cage 11 is arranged between the ball race and the spindle 1, and is freely rotatable in relation to the ball race 7 and is provided with recessess for accommodating respective balls 10. Arranged coaxially around the spindle 1 and the ball race 7 is nut body, generally referenced 12. For manufacturing reasons of a technical nature, the nut part of the illustrated embodiment comprises two sections 13 and 14 both of which are tubular, one fitting coaxially within the bore of the other to form a unitary subassembly. In the illustrated embodiment the ball retainer 11 is journalled with respect to nut section 13 by means of journalling balls 15. The ball race 7 is pivotally journalled to the nut section 13 by means of journalling balls 16, independently of the ball retainer 11. For manufacturing reasons of a technical nature, a mounting ring 17 is screwed into the right-hand end of the support unit of FIG. 1. The mounting ring 17 has tracks for respective journalling balls 15 and 16. The mounting ring 17 is locked in position with the aid of a locking screw 18. The outer, sleeve-like part 14 of the nut section 12 is attached to the nut section 13 in some appropriate manner, for instance by shrink-fitting. The support nut is also provided with two guide members 19, in the form, for instance, of screws having prism-shaped heads. These guide members are intended to run in guide channels or grooves in the cylinder 2, so as to enable the nut 6 to move axially along the cylinder without rotating or twisting. (The guide channels are not shown in FIG. 1.)

Figure 3:
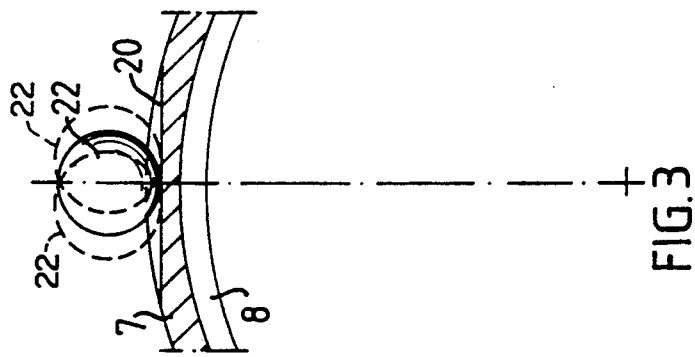
FIG. 3 is a fragmentary transverse cross-sectional view of the support nut shown in FIG. 2.

The ball race 7 is provided with a smoothed-down part 20 on the opposite thereof, approximately in the centre of the ball race, as willl be seen from FIGS. 2 and 3. The nut-section 13 is provided with a hole 21 axially centrally of the smoothed-down part (i.e., a flat-floored groove) 20. The hold 21 accommodates a ball 22, which abuts (i.e., seats in) the smoothed-dwon part 20. On the opposite side of the smoothed-down part 20, the ball 22 rests against a flexible cushion, for instance a rubber pad 23, which functions to urge a diametrically opposed radially innermost portion of the profile of the ball 22 against the smoothed-down part 20, with a given biasing force. Rings 24, made of antifriction material, such as Teflon ® polytetrafluroethylene slide against the inner surface of the cylinder 2 and guide each support nut 6 for non-rotational, axial movement in the cylinder.

The manner of operation of the arrangement will be described briefly with reference to FIG. 1. For the purpose of convenience in description, it is assumed that at an initial time, the nut 4 is located in the left-hand terminal position (i.e., is located adjacent the left-most end of the cylinder) with one support nut 6 located between a respective end surface of the nut 4 and the nearest cylinder end wall. Another support nut 6 is located approximately in the centre of the spindle 1 (i.e., midway between the axially opposite ends of the spindle 1). When the spindle 1 is rotated by a motor (not shown) operating on the protruding left end of the spindle 1, the nut 4 will move along the spindle, in the illustrated case to the right, at a speed corresponding to the screw-pitch of the spindle multiplied by the speed of spindle rotation. Because the balls of respective support nuts 6, rolling in the grooves defined by the screw-thread, are accommodated in the ball-retainer 11, which is freely pivotal in relation to the support nut, the support nut will move (to the right) at half the speed of the nut 4, rotation of the support nut being prevented by the guide members 19. Consequently, departing from the position of the nut 4 and the support nuts 6 illustrated in FIG. 1, when the spindle 1 is rotated, the nut 4 will moved at the aforesaid speed, whereas the support nuts 6 will move at half this speed and the right-hand support nut will reach the right-hand end wall of the cylinder at the same time as the nut 4 reaches the right-hand support nut. The left-hand support nut 6 will have moved forwards (i.e., axially rightwards), to a position which is approximately midway along the spindle during this time period. When the spindle is rotated in the angularly opposite direction, the aforedescribed sequence of movements will be repeated, but with the nut 4 and the support nuts 6 moving to the left in FIG. 1. Because the support nuts 6 are not forcibly guided in any way (except to axially move them while preventing their rotation, due to riding of the guide members 19 in the helical grooves between the thread crests on the spindle 1), and because, consequently, the support nut or support nuts is/are able to move at a faster speed than the aforesaid speed, as occurs when a support nut slips, the support nut (for instance the right-hand support nut 6) will reach the end wall of the cylinder before the nut 4 reaches its terminal position. Because the support nut 6 is prevented by engagement with the respective cylinder end wall from moving further to the right (according to the illustrated embodiment), continued rotation of the spindle 1 will cause the thread-flanks of the spindle to dog the balls 10 accommodated in the ball keeper 11 and force the ball race 7 to rotate against the action of the ball 22 and the rubber pad 23. Thus, when the support nut 6 is stationary, the spindle 1 can be allowed to rotate until the nut 4 has reached its intended terminal position. The support nut 6 is, in this way, automatically brought to the correct position on the screw spindle 1. When the screw spindle is subsequently rotated in the other direction, in order to move the nut 4 to the left in the illustrated embodiment, the smoothed-down part 20 of the support unit 6 will be rotated away from the ball 22 and thereby prevent further rotation of the ball race 7.

Although only one smoothed-down part 20 has been shown in FIG. 3, it will be understood that a plurality of such smoothed-down parts can be disposed around the ball race 7. In such an case, subsequent to the aforedescribed self-adjustment, the ball 22 will always be located in the proximity of or in abutment with one such smoothed-down part, thereby bringing the support nut 6 to a drive position more quickly. It is also conceivable to use a plurality of balls 22.

Figure 4:
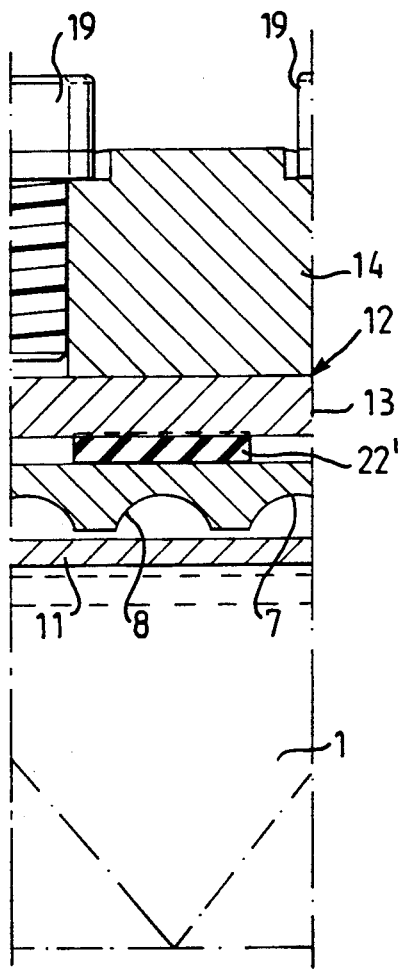
FIG. 4 illustrates, in fragmentary longitudinal cross-sectional view comparable to the axially central portion of FIG. 2 an alternative embodiment of the support nut of the invention.

FIG. 4 illustrates another embodiment of the braking element. In the case of this embodiment, the braking element comprises a body 22', for instance a ring which extends around the ball race 7 and, which may be attached to said ball race 7, and which is in frictional engagement with the nut-section 13. Thus, the body 22' functions to establish a firm connection between the ball race 7 and the nut section 12, in a manner similar to that described with reference to the ball 22 and the smoothed-down part 20, up to a given, predetermined torque between the ball race 7 and the nut section 12 at which the frictional holding force between these members is exceeded and the ball race 7 rotates in relation to the nut section 12. The body 22' may comprise a plurality of segments disposed around the ball race 7 and may, of course, be attached to the nut-section 13 instead of to the ball race 7.

In order to ensure that the support nut will move smoothly and to eliminate certain tolerance errors in the screw spindle, the ball race 7 is allowed to "tilt" to some extent in relation to the nut-section 12. This is achieved by giving the tracks in the nut-section 13 in which the journalling balls 16 run a part-profile generated by the sector of a circle having a radisu r whose centre point o lies on the axis 9 and in an imaginary plane which figuratively bisects the ball race 7 perpendicularly into two equal parts.

It will be understood that various members of the inventive arrangement can be replaced with other, technically equivalent members. For instance, the pad 23 can be replaced with a pressure spring and, furthermore, the aforesaid supporting device may have the form of rails or the like.

I claim:

1. A threaded spindle-nut drive assembly with a vibration-reducing support nut arrangement, comprising:

a longitudinally elongated spindle having external helically threaded provided therealong, and two axially opposite ends;

a cylinder having a tubular sidewall having an inner peripheral surface and a longitudinally extending slot provided through said sidewall, said slot extending throughout a longitudinally intermediate region disposed between axially opposite ends of said sidewall; said cylinder further having two axially opposite end walls;

said spindle being coaxially received in said cylinder with radial spacing from said inner peripheral wall, and journalled in said end walls for reversible angular rotation about its own longitudinal axis; means on said spindle for imparting reversible rotation to said spindle from externally of said cylinder;

a drive nut threadedly mounted on said spindle within siad cylinder so as to be driven in one longitudinal direction when said spindle is rotated in one angular direction, and to be driven in an opposite longitudinal direction when said spindle is rotated in an opposite angular direction;

a drive element having an external portion disposed outside said cylinder, and an internal portion extending from said external portion, through said slot, and connecting with said drive nut, so that said external portion of said drive element moves axially with said drive nut; and at least one vibration-reducing support nut arrangement for reducing vibration in said spindle as said spindle is rotated by said reversible rotation imparting means, said support nut arrangement comprising:

means defining a longitudinal groove in said inner peripheral surface of said cylinder;

at least one support nut coaxially received in said cylinder about said spindle, between said drive nut and a respective end wall of said cylinder;

each said support nut including a tubular nut body having an axial throughbore which receives and journals for relative angular rotation therein a tubular ball race coaxially radially surrounding a ball retainer, said ball retainer being freely angularly rotatable relative to said ball race;

means defining a plurality of axially spaced radially inwardly opening circumferential grooves in said ball race, said grooves being parallel to one another and each being disposed in a plane that is transverse to said longitudinal axis of said spindle;

said ball retainer having a plurality of openings formed therethrough in registry with respective ones of said grooves;

plurality of bearing balls cooperatively rollingly received between respective ones of said grooves and between respective flanking thread-crests of said helical threading on said spindle; said balles extending through respective ones of said openings through said ball retainer;

guide means projecting radially outwardly from said nut body into said longitudinal groove in said inner peripheral surface of said cylinder, so that said nut body is constrained against angular rotation but permitted to move axially as said spindle is angularly rotated; and a releasable-relockable relative rotation locking means disposed radially between said nut body and said ball race for preventing substantial relative angular rotation between said ball race and said nut body unless rotational torque between said ball race and said nut body exceeds a predetermined amount.

2. The assembly of claim 1, wherein:
said locking means comprises:
at least one locking ball; means defining in said ball race an external transverse groove that is generally flat in transverse cross-section of said ball race; a radially inwardly opening socket formed in said axial throughbore of said nut body; said locking ball being cooperatively received between said external transverse groove and said socket; and resilient means acting between said nut body and said locking wall for urging said locking ball generally radially inwardly against said ball race in said external transverse groove.

3. The assembly of claim 2, wherein:
said resilient means is constituted by a pad made of resilient flexible material.

4. The assembly of claim 1, wherein:
said locking means is constituted by at least one friction brake which permits slips upon being subjected to angular torque exceeding said predetermined amount.

5. The assembly of claim 1, wherein:
said ball race is journalled for rotation with respect to said nut body by angle-contact ball bearings.

6. The assembly of claim 5, wherein:
said angle-contact ball bearings run in two axially opposite ball bearing tracks in said nut body, each of which has a profile generated by a respective radius having a center which is located on said longitudinal axis of said spindle axially centrally between said two ball bearing tracks.

* * * * *